United States Patent Office 3,374,981
Patented Mar. 26, 1968

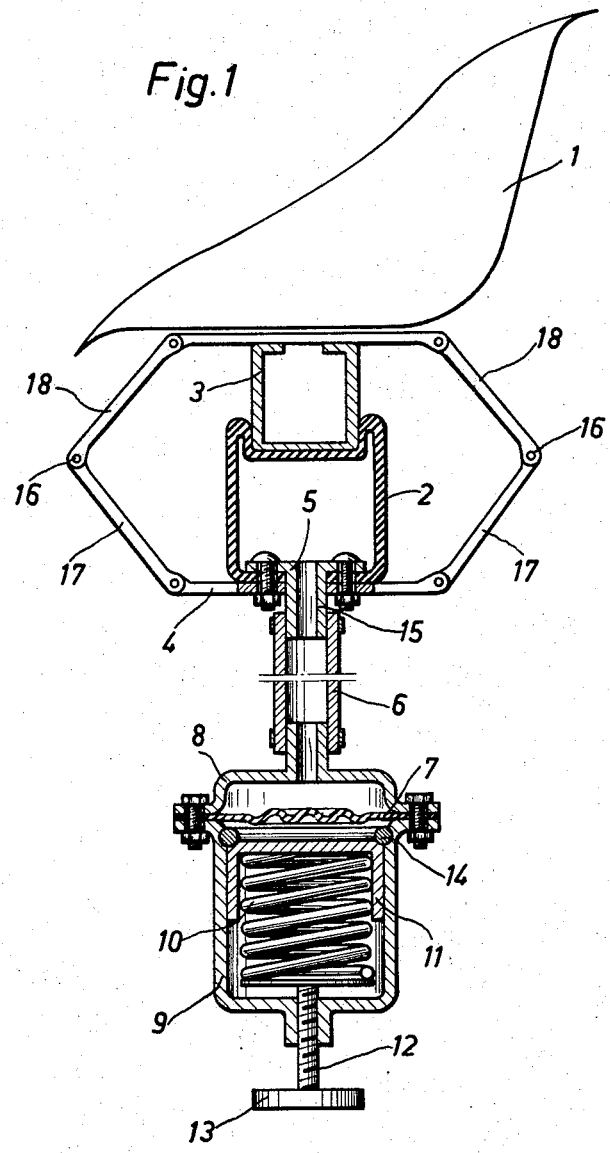

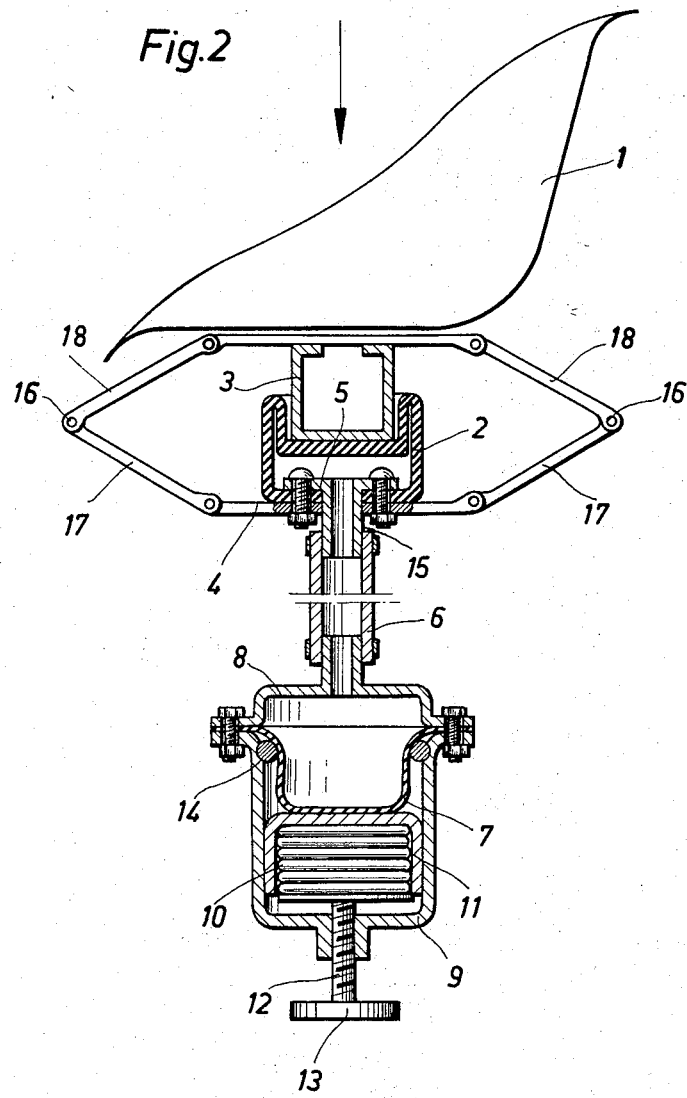

3,374,981
SPRING SUSPENSION FOR A SEAT
Anton Stuckenberger, Vagen, and Arnold Tschursch, Hinrichssegen, Post Heufeld, Germany, assignors to Georg Fritzmeier, Kommanditgesellschaft, Grosshelfendorf, Germany, a firm of Germany
Filed July 7, 1965, Ser. No. 470,100
Claims priority, application Germany, Aug. 28, 1964, F 43,848
7 Claims. (Cl. 248—400)

ABSTRACT OF THE DISCLOSURE

Spring suspension for a vehicle seat in which a rolling-type bellows device is positioned under the seat. A diaphragm is connected to a pneumatic transmission line to enclose an air column, which can be moved against an adjustably spring-loaded piston by displacing the diaphragm.

---

The invention relates to a spring suspension for a seat, particularly for non-track-bound vehicles.

Seats, particularly bucket seats of the kind principally used in agricultural and building machines, are always suspended from springs consisting of steel and/or rubber. For achieving a more or less acceptable degree of damping as well as for adapting the suspension to different loads, expensive arrangements are needed which take up much space and therefore oblige the designer, for instance in tractors which afford little room for mounting a seat, to content himself with solutions based on unfavourable compromises.

The present invention provides a spring seat suspension which is characterised by the provision under the seat of a rolling type bellows device which carries the seat and which together with a membrane connected thereto by a pneumatic transmission line encloses a given, preferably uncompressed column of air which can be moved against an adjustably spring-loaded piston by displacing the membrane.

This seat suspension is particularly suitable for tractors. It requires extremely little space for its accommodation because only the rolling bellows device need be located under the seat whereas the assembly membrane and piston, which may be connected to the rolling bellows device for instance through a flexible tube, may be located elsewhere in the vehicle where it is not in the way. If the precompression of the spring is adjustable, the asembly is conveniently installed where it is easily accessible for the manual adjustment of the spring to existing requirements.

Preferably the precompression of the spring is arranged not to affect the occluded column of air. When the seat is merely statically loaded by the dead weight of the driver the air column as such will act as a cushion. In view of its high compressibility in the low pressure region the air cushion has a soft spring effect which can be used for supporting the static load. At the same time the air cushion has excellent damping properties due to the low natural frequency of such a column of air.

The supplementary mechanical springing provided by the piston and its supporting spring is arranged not to become functional until the air cushion has become too hard, i.e., until a given dynamic load is exceeded. The spring rate of the air cushion is thus modified to become degressive from a point at which the resistance to further compression becomes excessively high.

The cooperation of an air cushion with its low natural frequency and of mechanical springing provides a degree of damping such as has not hitherto been achieved in any known type of mechanical spring suspension.

Damping can be easily further increased by incorporating a throttle in the pneumatic transmission line.

In a particularly simple arrangement the rolling bellows device is of cylindrical form supporting the seat on an interposed plunger which presses axially into the top of the bellows. Preferably the seat is axially guided.

This can be conveniently done by guiding the seat on diametrically opposite sides of the rolling type bellows by symmetrically disposed toggles, each comprising two hinged toggle arms of which one is linked to the seat and the other to the baseplate of the rolling bellows device.

Preferably the piston may be slidably movable against an abutment under the membrane in a cylinder closed at one end by the diaphragm, whereas a screw is provided which can be turned into the other end of said cylinder by means of a handwheel to compress a coil spring between the screw and the underside of the piston.

The invention will be hereinafter described by reference to an embodiment schematically shown in the drawings in which FIGURE 1 is a spring suspension for a seat shown in the position it occupies when the seat is not under load.

FIGURE 2 is the spring suspension according to FIGURE 1 when the load rises beyond the normal static load.

As illustrated in FIG. 1 a rolling bellows device 2 in the form of an upright cylinder is located under a bucket seat 1 which rests on a plunger 3 adapted to sink axially into the bellows device. The bottom end of the rolling bellows device is tightly held between two plates 4 and 5 and has a central opening. A tube or pipe 6 connects this opening to a chamber 8 which is closed by a stretchable sealing membrane 7 and forms the head of a cylinder 9 in which a piston 11 is slidably displaceable against the resistance of a spring 10 when the membrane 7 is forced downwards by a vertical load. The end of spring 10 remote from the piston is supported on a screw 12 which can be turned further into or out of the cylinder by a hand wheel, as may be desired (for adjusting the precompresison of the spring 10). In position of rest the piston bears against a retaining shoulder 14 directly under the membrane and in this position the precompression of the spring should be substantially equal to the static load on the seat due to the dead weight of the driver. Care should be taken to see that under this load the air column is not already too highly compressed to prevent it from having an adequately soft cushioning effect. When the vehicle rides over bumps and the load rises sufficiently to overcome the precompression of the spring, then the membrane will displace the piston against the spring into the cylinder, whilst plunger 3 which carries the seat pushes the rolling bellows further down, as indicated in FIGURE 2.

The combination of a pneumatic suspension with mechanical springing generates a degree of damping that is superior to any hitherto achieved in spring suspension for seats, this being due to the low natural frequency of the air cushion and the resistance to flow experienced by the displaced air.

This effect can be further assisted by incorporating a throttle 15 in the path of the occluded column of air, say directly below the rolling bellows.

In order to prevent the seat from tilting it is associated with suitable guide means. These may consist for instance of symmetrically disposed toggles located on diametrically opposite sides of the rolling bellows device 2, the two toggle arms 17 and 18 being hinged at 16 and their free ends linked on the one hand to the ends of the bucket seat and on the other hand to the baseplate 4 of the rolling bellows device.

We claim:
1. A pneumatically cushioned seat assembly for a field tractor or the like comprising
a seat member and a base, the seat member being adapted for movement towards the base and back;
guide means to effect alignment between the seat and the base;
an air-containing device directly in contact with the said seat and acting as the sole support of said seat;
a cylinder mounted on said base having a top closure;
a piston in said cylinder defining an air space between said top closure and the upper side of the piston and being capable of displacement longitudinally of said cylinder;
adjustable spring biasing means acting upon said piston and urging the piston towards said top closure;
and pneumatic transmission means connecting said air air-containing device with the top closure of the cylinder and providing a compressible fluid connection between the interior of the air-containing device and the air space within said cylinder, said air-containing device, the air space between the top closure and the upper side of the pitson, and said pneumatic transmission means forming a closed pneumatic system whereby, upon loading and movement of the seat member towards said base, the air contained in the air-containing device is both compressed and displaced into the air space of said cylinder to provide for air-cushioning, and further acts upon the piston, the piston displacing against the action of the spring-biasing means when the pressure of the air in the pneumatic system exceeds the force of the spring.

2. The assembly of claim 1 in which the guide means comprises two toggles, disposed upon opposite sides of the air containing device, each toggle having two hinged arms, each toggle linked at one free end to the seat and at the other end to the base.

3. The assembly of claim 1 in which the spring biasing means for the piston comprises
a compression spring acting against the rear of the piston,
a support for the opposite end of said spring,
a threaded shaft carrying said spring support and extending through a threaded bushing upon the base of said cylinder,
and a handwheel secured to the external end of the shaft whereby the compression of said spring may be adjusted.

4. The assembly of claim 1, wherein said air-containing device comprises an inexpansible air-filled bellows, said bellows being deformed by relative motion of said seat member and base.

5. The assembly of claim 1, including a flexible sealing membrane mounted in said cylinder beneath the top closure thereof and closing the air space toward the piston, said membrane being movable into contact with said piston to displace the piston as the air in the air-containing device, the pneumatic transmisison means and the top closure is compressed beyond the force of the spring bias.

6. The assembly of claim 1, including a throttling means inserted in the pneumatic transmission means to control the rate of flow therethrough.

7. The assembly of claim 1, including means limiting the displacement of said piston towards the top closure comprising stop means located within said cylinder.

References Cited
UNITED STATES PATENTS

| | | | |
|---|---|---|---|
| 1,695,732 | 12/1928 | Hyndman | 248—157 X |
| 3,144,270 | 8/1964 | Bilancia | 297—180 |
| 3,168,278 | 2/1965 | Ogden | 248—377 |

JOHN PETO, *Primary Examiner.*

ROY D. FRAZIER, *Examiner.*